(No Model.) 2 Sheets—Sheet 1.
A. A. ARMSTRONG.
COMBINATION FREEZING AND PRESERVING HOUSE FOR FISH, MEATS, &c.
No. 301,549. Patented July 8, 1884.
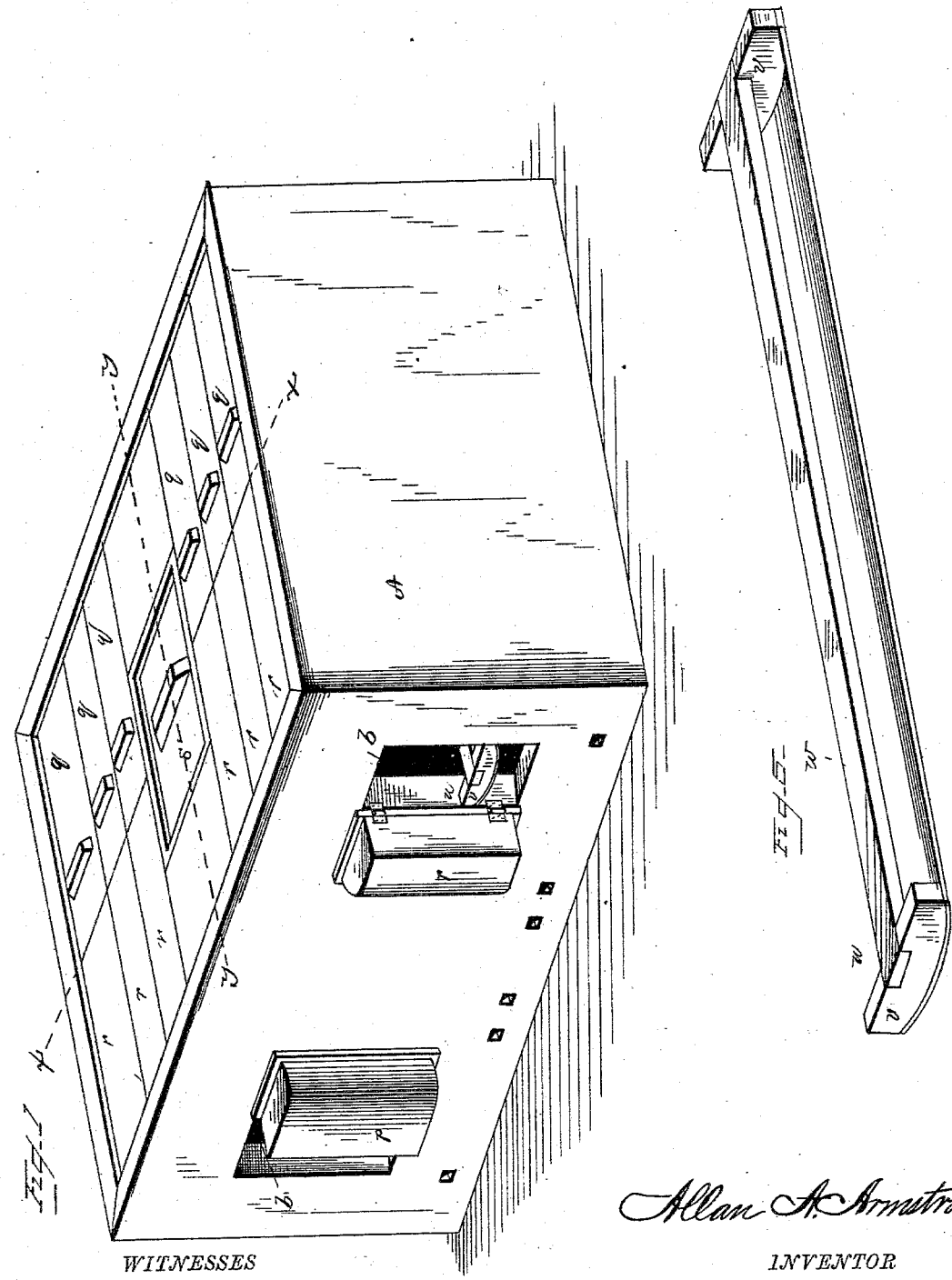
WITNESSES
F. L. Ourand
E. G. Siggers
INVENTOR
Allan A. Armstrong
by C. A. Snow & Co.
Attorneys

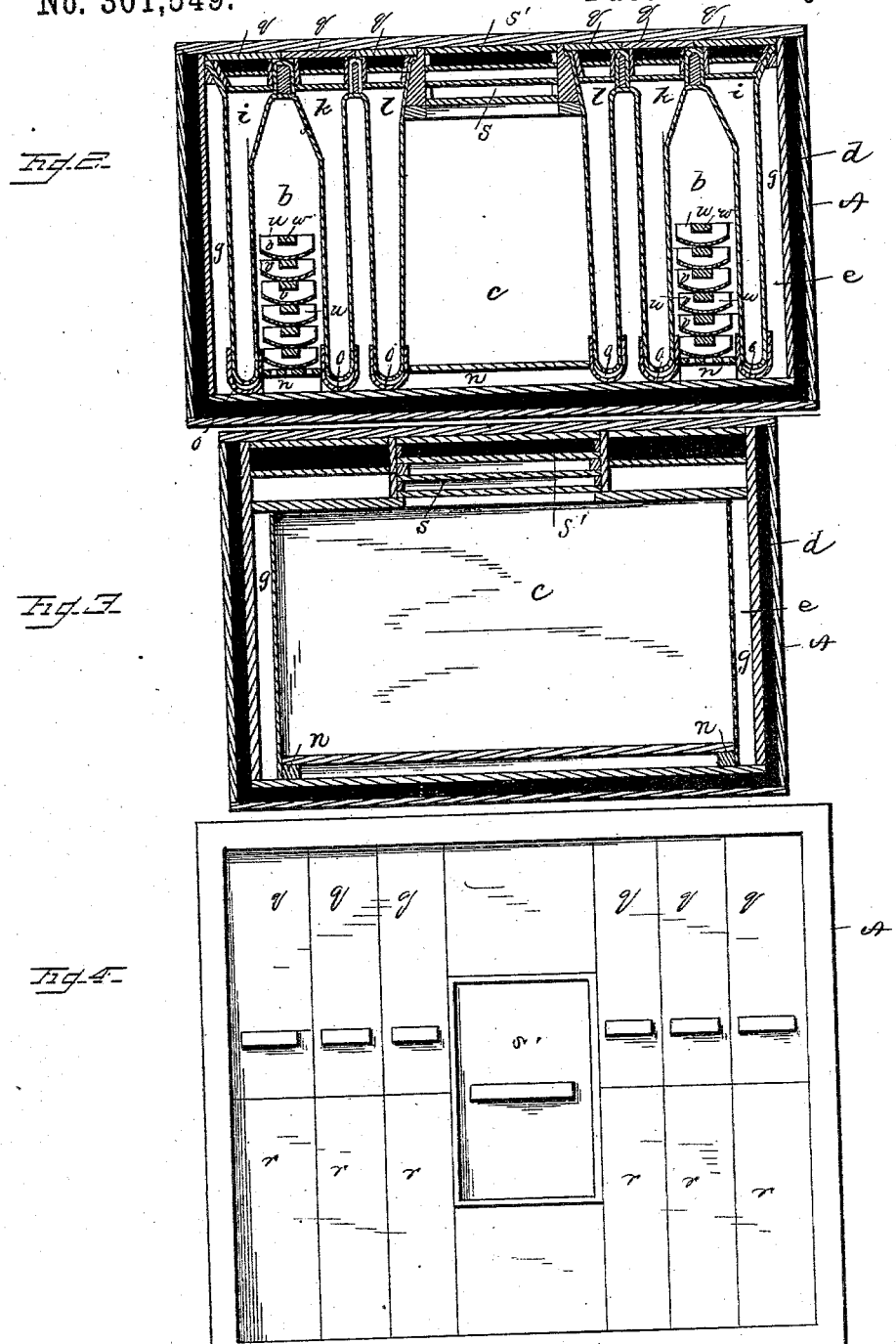

UNITED STATES PATENT OFFICE.

ALLAN A. ARMSTRONG, OF MARINETTE, WISCONSIN.

COMBINATION FREEZING AND PRESERVING HOUSE FOR FISH, MEATS, &c.

SPECIFICATION forming part of Letters Patent No. 301,549, dated July 8, 1884.

Application filed March 25, 1884. (No model.)

*To all whom it may concern:*

Be it known that I, ALLAN A. ARMSTRONG, a citizen of the United States, residing at Marinette, in the county of Marinette and State of Wisconsin, have invented a new and useful Combination Freezer and Dead-House for Fish, Meats, &c., of which the following is a specification, reference being had to the accompanying drawings.

This invention has relation to combined freezers and dead-houses for freezing and packing, so as to keep them frozen for long periods of time, fish and meats in large quantities, in such a manner that the fish will not rust at the top, bottom, and sides of the dead-houses, as heretofore; and it consists in the construction and arrangement of the parts of the freezers and dead-houses, as will be hereinafter fully described, and particularly pointed out in the claims appended hereto.

Figure 1 is a view in perspective of the device, showing the door of the freezer-compartment open and the fish-trays in place therein. Fig. 2 is a transverse vertical section on the line $x\,x$ in Fig. 1. Fig. 3 is a longitudinal vertical section on the line $y\,y$ in Fig. 1. Fig. 4 is a plan view, the cover being removed; and Fig. 5 is a detail view of one of the trays.

The difficulty attending the packing of fish and meats in the dead-houses to keep them frozen for long periods of time has been that heretofore none of the freezing or refrigerating houses have been so constructed that they would prevent the fish, especially, from rusting and decaying, owing to the dampness generated in the walls of the dead-houses. In my construction I have overcome this defect, which has heretofore entailed so much loss on fish-merchants who pack their fish at the fisheries and keep them on hand ready for shipment to their city customers. In my long experience I have discovered that a dry frost is necessary in the dead-houses to secure the fish against rust and decay, and I am now able to produce such a frost and maintain it for any desired length of time. With a freezer and dead-houses—six in number—I have kept in each dead-house six thousand pounds of fish, which I subsequently sold at the expiration of six months, partly in Boston and partly in New York city, (the fish having been packed in New Brunswick,) in a perfectly sound and fresh condition.

Referring by letter to the accompanying drawings, in which I have illustrated only two freezers and one dead-house, A designates the incasement which incloses the freezing-compartment $b$ and the dead-houses $c$. The walls of the incasement are double walls. The outer portions, $d$, are packed with sawdust, and their inner portions, $e$, are formed by the metal walls of the dead-house $c$ and the walls of the battery-cells, so that an air-space, $g$, is left around the dead-houses. The bottom and ceiling are similarly constructed with air-spaces, as are also the doors, hereinafter explained. The air-spaces in the double wall, doors, &c., have no communication with the interior part or with the outside. They are dead-air spaces. The dead-house is preferably square in form, and should be of a size that will hold six thousand pounds of fish or four thousand pounds of meat. The battery-cells $i\,k\,l$ are located at the sides of the freezing-compartments, and also at the sides of the dead-house pans, as shown. The bottoms of the freezing-compartments and dead-houses are provided with loose wooden floors secured to cross-strips $n\,n$ near each end, which elevate the floors and leave air-spaces beneath them, so that the frost can come up through said bottoms to the fish. Under the battery-cells, as well as under the dead-house pans, are drip-troughs $o$, which carry off the water as the salt melts the ice. The door $p$ of the freezing-compartment is constructed with an air-space, $g$, and an outer packed portion similar to the incasement-walls. The covers $q\,r$ to the battery sections or cells are also provided with air-spaces $g$ below their packed portions. The doors to the dead-house are made in two parts, the lower one, $s$, being hollow, as shown, and the upper one, $s'$, being packed with sawdust, and provided with cleats on its under face to raise it above the hand-piece on the inner door, $s$, when in position.

The trays $u$ are of galvanized iron, concave in their upper faces in cross-section, and perforated near each end to form drip-openings. They are secured at each end to blocks $v\,v$, notched in their upper edges and connected by a wooden bar, w. The trays are made concave, in order that the fish, when frozen thereon, will retain their plump natural appearance. Flat trays would disfigure the appearance of the fish. These trays are filled with fish laid thereon so as to preserve their natural shape. The trays are then placed in the freezing-compartment and the door closed. A box about four feet long, eighteen inches wide, and twelve inches deep should be filled to within two inches of the top with broken or crushed ice, and one bucketful of salt should be placed on and thoroughly mixed with the ice. The battery-pans are provided with small perforations in their bottoms for the melted ice to run out through into the drip-troughs. The mixed ice and salt is then placed in the battery-pans, which should be filled up, just leaving room enough for the covers to be put in place. After the fish have been thoroughly frozen, they having been first washed, they are taken from the trays and dipped head downward into a box filled with snow, which fills the mouth of the fish and excludes the air from the interior of the fish. The bottom of the dead-house, or rather the loose wooden floor of the same, is then covered with about two inches of snow, and the fish are packed in the dead-house with their heads toward the walls of the pan. This is done in order to permit the frost to circulate freely through them from pan to pan. Snow is only used on the loose floor for the first layer of fish. The remainder of the fish are packed without snow or ice until the dead-pans are filled, when the doors are put in place and the cover closed down and sealed.

The fish are all first frozen, for the reason that if part only were frozen and soft fish were put in with them the soft fish would draw the frost out of the frozen ones and cause rust, which would damage the whole lot of fish in the dead-house.

The air-spaces $g$ in the walls, floor, ceiling, doors, and battery-covers prevent any dampness being generated in the dead-house, whereas if these spaces were filled with tangible material, dampness would be created therein, and the fish would rust, and losses, as heretofore, would result.

I have found by actual trial that with the air-spaces as herein constructed a dry frost is circulated through the dead-house, and that this kind of a frost prevents rust and decay of the fish. I also know from former experience that the dampness caused the rust, and that the rust caused the damage to the fish, and the consequent loss resulting therefrom.

This refrigerator is simple and comparatively inexpensive, and is thoroughly efficient for the purposes for which it is intended.

A thermometer is provided for the refrigerator to indicate the temperature in the same, so that it may be determined therefrom when the battery needs replenishing.

Having thus fully described my invention, what I claim as new, and desire to secure by Letters Patent, is—

1. In a refrigerator, the combination, with the freezing-compartment surrounded with an air-space, of the concave trays secured to wooden end blocks connected by a wooden bar, substantially as specified.

2. The combination, with the incasement having the double walls, doors, and battery-cover, the outer portions of each being packed with non-conducting material, and the inner portions left vacant to form dead-air spaces, of the pan $c$, battery-cells $i$ $k$ $l$, and freezing-compartments $b$, substantially as specified.

In testimony that I claim the foregoing as my own I have hereto affixed my signature in presence of two witnesses.

ALLAN A. ARMSTRONG.

Witnesses:
A. M. FAIRCHILD,
JOHN ARMSTRONG.